(12) United States Patent
Kocks et al.

(10) Patent No.: US 9,367,615 B2
(45) Date of Patent: Jun. 14, 2016

(54) SYSTEMS AND METHODS FOR ORGANIZING AND DISPLAYING ELECTRONIC MEDIA CONTENT

(75) Inventors: Peter F. Kocks, San Francisco, CA (US); Moninder Jheeta, Redmond, WA (US); Brett Aladdin Barros, San Francisco, CA (US)

(73) Assignee: AOL Inc., Dulles, VA (US)

( * ) Notice: Subject to any disclaimer, the term of this patent is extended or adjusted under 35 U.S.C. 154(b) by 592 days.

(21) Appl. No.: 13/046,253

(22) Filed: Mar. 11, 2011

(65) Prior Publication Data

US 2011/0246440 A1  Oct. 6, 2011

Related U.S. Application Data

(60) Provisional application No. 61/313,439, filed on Mar. 12, 2010.

(51) Int. Cl.
*G06F 17/30* (2006.01)
*H04N 21/472* (2011.01)

(52) U.S. Cl.
CPC .... *G06F 17/30781* (2013.01); *G06F 17/30837* (2013.01); *G06F 17/30867* (2013.01); *H04N 21/472* (2013.01)

(58) Field of Classification Search
CPC ...................................... G06F 17/30
See application file for complete search history.

(56) References Cited

U.S. PATENT DOCUMENTS

| | | | |
|---|---|---|---|
| 6,195,657 B1 | 2/2001 | Rucker et al. | |
| 2003/0126235 A1* | 7/2003 | Chandrasekar et al. | 709/220 |
| 2005/0080764 A1* | 4/2005 | Ito | 707/1 |
| 2006/0064411 A1* | 3/2006 | Gross et al. | 707/3 |
| 2010/0050211 A1* | 2/2010 | Seldin | H04N 5/44543 725/46 |
| 2010/0070507 A1* | 3/2010 | Mori | 707/741 |
| 2011/0099488 A1* | 4/2011 | Jin et al. | 715/764 |

FOREIGN PATENT DOCUMENTS

| | | |
|---|---|---|
| WO | WO 2006/002180 A2 | 1/2006 |
| WO | WO 2007/135436 A1 | 11/2007 |

OTHER PUBLICATIONS

International Search Report and Written Opinion in International Application No. PCT/US2011/028176 mailed Mar. 22, 2012 (12 pages).

* cited by examiner

*Primary Examiner* — Miranda Huang
(74) *Attorney, Agent, or Firm* — Finnegan, Henderson, Farabow, Garrett & Dunner, LLP

(57) ABSTRACT

Systems and methods are disclosed for displaying available or recommended electronic multimedia content to a user, including electronic media content on the Internet. According to one implementation, a method is provided that includes receiving a request from a user, the request specifying electronic media content desired by the user; analyzing an indexed web history of a plurality of other users, based on the request for desired content; and selecting and sorting a subset of available content groups, based on the request for desired content and the indexed web history. The method also includes selecting and sorting, for each selected and sorted content group, a subset of available content; providing instructions to display, to a user, the selected and sorted content groups along a first axis of a two-dimensional grid; and further providing instructions to display, to the user, the selected available content for each content group along a second axis of the two-dimensional grid.

20 Claims, 13 Drawing Sheets

Key navigation multi-dimensionally

Mouse navigation multi-dimensionally

Touch navigation multi-dimensionally

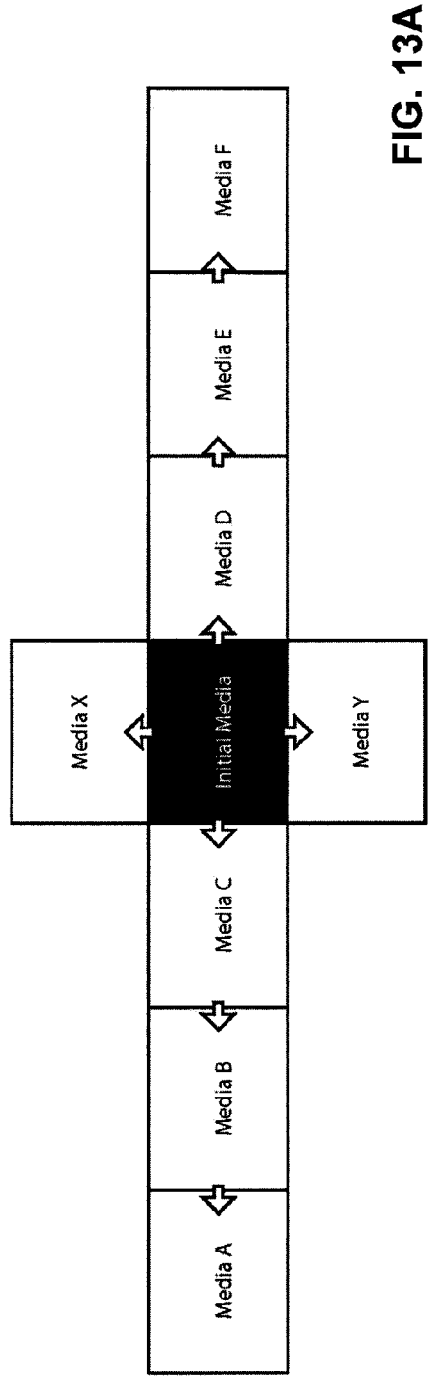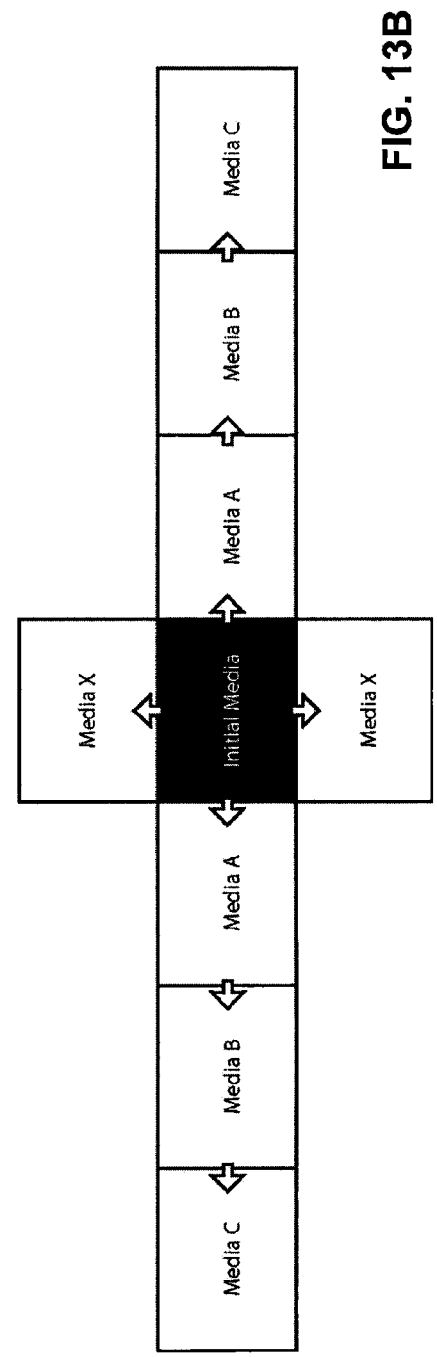

SYSTEMS AND METHODS FOR ORGANIZING AND DISPLAYING ELECTRONIC MEDIA CONTENT

RELATED APPLICATION

This application claims the benefit of priority of U.S. Provisional Application No. 61/313,439 filed Mar. 12, 2010, for Systems And Methods For Organizing And Displaying Electronic Media Content, the entirety of which is included herein by reference.

BACKGROUND

1. Technical Field

The present disclosure relates to the organization and display of electronic media content, including available or recommended electronic media content. More particularly and without limitation, the present disclosure relates to systems and methods for the identification, ranking, and display of available or recommended electronic media content on the Internet.

2. Background Information

Traditionally, broadcasters of television multimedia content have used electronic programming guides (EPG) to display available television content in a two-dimensional grid. EPGs typically display a list of television channels on the vertical axis, and a broadcast time on the horizontal axis. Thus, the arrangement of content in the two-dimensional grid is used to convey information about the content (namely, channel and time).

EPGs are primarily used as a way to browse broadcast television content that is currently on-air or about to be on-air, and to browse recorded content on time shifting devices, such as a digital video recorder (DVR). EPGs may be useful for displaying available content that only airs at specific times, but EPGs have not previously been used for displaying web content that can be selected and viewed by an Internet user at any moment.

On the Internet, people usually discover and view multimedia and other electronic media content in one or more fundamentally different ways: keyword searching, browsing collections, selecting related content, and link sharing. Because the content may be viewed at any time, it is typically just listed in a one-dimensional queue that fails to convey any information about the content by virtue of its arrangement. For example, a common way to browse a video collection is to display a list of images that the user can click to watch the videos. A user interface may be provided to allow the user to narrow the displayed list by category, television show, tag, date produced, source, or popularity. However, the list may nevertheless fail to sufficiently convey additional information, guidance, or suggested content to the user. The user is usually required to determine which video to select without knowing whether it will likely be enjoyable. As a result, users of the Internet often view content that they do not necessarily appreciate. Undesirable content can lead to users traveling away from the content sites, which may result in an attendant decrease in advertising revenue. As a corollary, the successful display and recommendation of electronic media content can be useful in attracting and retaining Internet users, thereby increasing online advertising revenue.

As a result, there is a need for improved systems and methods for organizing and displaying electronic media content, including available or recommended electronic media content. There is also a need for systems and methods for the identification, ranking, and/or display of available or recommended electronic media content on the Internet.

SUMMARY

Consistent with the present disclosure, computerized systems and methods are provided for organizing and displaying electronic media content, including available or recommended electronic media content. Embodiments of the disclosure also relate to the identification, ranking, and/or display of available or recommended electronic media content on the Internet. In accordance with certain embodiments, computerized systems and methods are provided for organizing and displaying electronic media content over the Internet.

In accordance with one disclosed exemplary embodiment, a method is disclosed for displaying electronic multimedia content to a user. The method includes receiving a request from a user, the request specifying electronic media content desired by the user; and analyzing an indexed web history of a plurality of other users on the request for desired content. The method further includes: selecting and sorting a subset of available content groups, based on the request for desired content and the indexed web history; and selecting and sorting, for each selected and sorted content group, a subset of available content, based on the desired content and the indexed web history. The method further includes: providing instructions to display, to the user, the selected and sorted subset of content groups along a first axis of a two-dimensional grid; and further providing instructions to display, to the user, the selected and sorted subset of available content for each content group along a second axis of the two-dimensional grid.

In accordance with another disclosed exemplary embodiment, a method is disclosed for displaying electronic multimedia content to a user. The method includes receiving a URL for a web page previously visited by a user; and analyzing an indexed web history of a plurality of other users based on the URL. The method further includes: selecting and sorting a subset of available content groups, based on the URL and the indexed web history; and selecting and sorting, for each selected and sorted content group, a subset of available content, based on the URL and the indexed web history. The method further includes: providing instructions to display, to the user, the selected and sorted subset of content groups along a first axis of a two-dimensional grid; and further providing instructions to display, to the user, the selected and sorted subset of available content for each content group along a second axis of the two-dimensional grid.

In accordance with another disclosed exemplary embodiment, a system is disclosed for displaying electronic multimedia content to a user. The system includes a web server system configured to receive a request from a user, the request specifying desired electronic media content, a database configured to store an indexed web history for a plurality of other users, and a back-end server system in communication with the web server and the database. The back-end server system is configured to: analyze the indexed web history of a plurality of other users based on the request for desired content; select and sort a subset of available content groups based on the request for desired content and the indexed web history; and select and sort, for each selected and sorted content group, a subset of available content, based on the desired content and the indexed web history. The back-end server system is further configured to populate a first axis of a two-dimensional grid with the selected and sorted content groups; and populate a second axis of the two-dimensional grid with the selected and sorted available content for each content group.

Before explaining certain embodiments of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF DRAWINGS

The accompanying drawings, which are incorporated in and constitute a part of this disclosure, illustrate several embodiments and aspects of the present disclosure, and together with the description, serve to explain certain principles of the invention. In the drawings:

FIG. 5 is an illustration of an exemplary two-dimensional grid for displaying electronic media over the Internet, consistent with embodiments of the present disclosure;

FIG. 7 shows a screenshot of a web programming grid, in which a query in a search bar yields query-related results and navigational tab;

FIG. 9 shows a screenshot of a web programming guide in which a search bar starts displaying possible queries upon a partial entry of text, consistent with embodiments of the present disclosure;

FIGS. 13A and 13B illustrate exemplary responses to directionality within a dimension, depending on prior actions, consistent with embodiments of the present disclosure.

Figure 1:
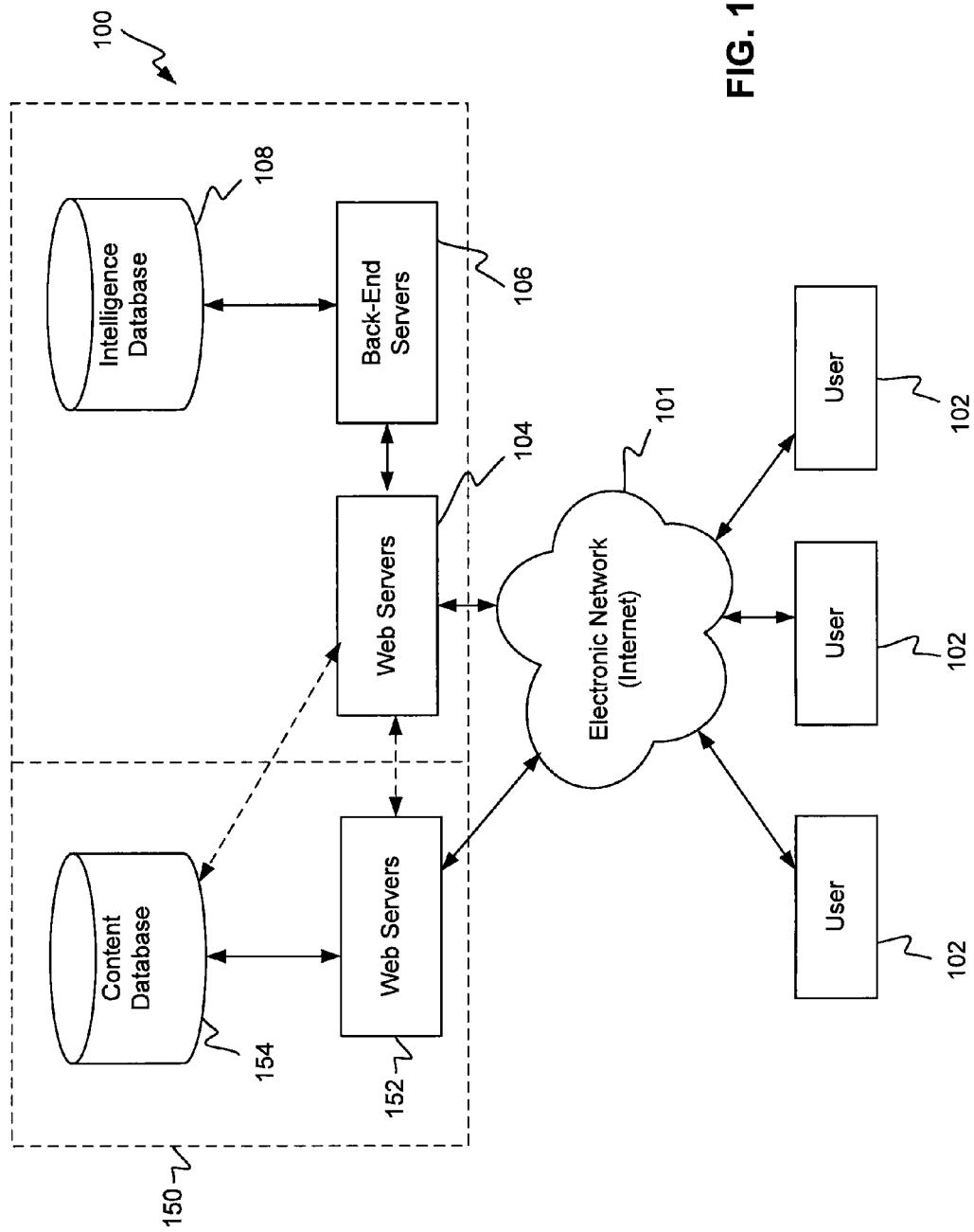
FIG. 1 depicts an exemplary system for displaying electronic media content over the Internet, consistent with embodiments of the present disclosure.

Like reference symbols in the various drawings indicate like elements. For brevity, several elements in the figures described below are represented as monolithic entities. However, as would be understood by one skilled in the art, these elements each may include numerous interconnected computers and components designed to perform a set of specified operations and/or dedicated to a particular geographic region.

Additional objects and advantages will be set forth in part in the description which follows, and in part will be obvious from the description, or may be learned by practice of the embodiments of the invention. For example, the objects and advantages may be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

Embodiments of the present disclosure relate to the organization and display of available or recommended electronic media content. The display of electronic media content may be made in response to a request from a user specifying desired content. Additionally, the display of electronic media content may be presented in a multi-dimensional grid, referred to herein as a "web programming guide" (WPG). In one exemplary embodiment, a novel two-dimensional collaborative filter may be used as the algorithm for populating the WPG with available or recommended electronic media content, such as web content. A WPG, in contrast to a traditional EPG, may display exclusive web content in addition to television programming that is available on the Internet. For example, consistent with certain embodiments, a WPG may display a gridded arrangement of web sites, images, video clips, audio clips, streaming media, full length television episodes or movies, and/or live broadcasts.

In one embodiment, the two-dimensional collaborative filter may make use of one collaborative filter to populate suggested groupings of content (e.g. categories, topics, show times, channels, shows, daypart programming, actors, directors, watched or favorited by friends (e.g. browse by friend x,y,z), celebrity appearances, shared interests by video attributes (e.g. algorithmically determined grouping of videos watch by people who like 30 rock), etc.) along a first axis of the WPG, and another collaborative filter to populate recommend video content (e.g., either individual videos or shows) and/or other electronic media content within each content grouping, along a second axis of the WPG. Each of the two collaborative filters may receive inputs including one or more of: the last content item (e.g., video) that was watched by a user prior to the WPG being invoked; the user's selected preferences (e.g., "I like sports"); a history of the user's web history/behavior; a history of other users' web history/behavior; and simply visiting a website or television interface that makes use of the WPG.

Broadly, as will be described in more detail below in relation to the exemplary embodiments of the WPG (see, e.g., the embodiment of FIG. 5), the output of the two-dimensional collaborative filter may be displayed in a gridded format, where one axis includes a list of content groups ranked by the first collaborative filter, and the second axis includes a list of content items that belong to each group (ranked within each group using the second collaborative filter). Although one of the disclosed embodiments includes a two-dimensional grid, it will be appreciated that any number of dimensions may be included, where each dimension presents content that is rank-ordered using another collaborative filter. For example, the grid may comprise three or more dimensions (as shown in FIG. 11). Furthermore, although described herein primarily in relation to video content, the disclosed embodiments may be applicable to literally any type of electronic media content, including websites, images, books, articles, songs, presentations, etc.

FIG. 1 depicts an exemplary embodiment of a system 100 for displaying electronic media content, within which embodiments of the present disclosure may be practiced. As shown in FIG. 1, a plurality of users 102 may be connected to an electronic network 101 and configured to communicate with one or more servers of system 100. Users 102 may be people who are using any type or combination of personal computers, laptops, components of a computer, set top boxes, $3^{rd}$ party portals, DVD players, digital video recorder (DVR) platforms, mobile phones or devices, PDAs, etc., or any other device configured to display multimedia content. Although the embodiment of FIG. 1 depicts limited numbers of clients and servers, it will be appreciated that exemplary system 100 may include any number of clients and servers without departing from the spirit or scope of the present disclosure.

Electronic network 101 may represent any combination of networks for providing digital data communication. Electronic network 101 may include, for example, a local area network ("LAN"), and intranet, and/or a wide area network ("WAN"), e.g., the Internet. In the embodiments described herein, electronic network 101 may include any publicly-accessible network or networks and support numerous communication protocols, including, but not limited to, hypertext transfer protocol (HTTP) and transmission control protocol (TCP/IP).

In general, system 100 may include web servers 104, back-end servers 106, and an intelligence database 108. System 100 may also include or be disposed in communication with a content provider 150. Content provider 150 may be operated by a third party or by the operator of system 100. Content provider 150 may include web servers 152 and content database 154. Electronic network 101 may be connected to one or more of servers 104, 106, 152 such that clients 102 may be disposed in communication with the servers. It will be appreciated that each of servers 104, 106, 152 may include any number or combination of computers, servers, or clustered computing machines, and that databases 108, 154 may each include any number or combination of databases, which may be arranged in a "distributed computing" environment, including large-scale storage (LSS) components and/or distributed caching (DC) components. The servers and databases may be independent devices or may be incorporated into a single unit of hardware, e.g., a single computer system or single server system. In one embodiment, web servers may include a software application, such as a web service, executing on a computer.

In one embodiment, intelligence database 108 may be configured to store a large volume (millions or more) of pieces of data regarding user preferences, user web history, content click data, user browser information, etc. For example, intelligence database 108 may be configured to store and index cookie data collected by the browsers of millions of unique users. Meanwhile, content database 154 may be configured to store a large volume of different content items, such as videos, images, etc. Content database 154 may be operated by one or more third-party content providers 150, or by the operator of web servers 104 and back-end servers 106. Alternatively the operator of web servers 104 and back-end servers 106 may maintain its own database of content items. Thus, any combination or configuration of web servers 104, back-end servers 106, intelligence database 108, web servers 152, and content database 154 may be configured to perform the exemplary methods of FIGS. 2-4; and to generate and display the exemplary WPGs of FIGS. 5 and 6, as will be described in more detail below.

Figure 2:
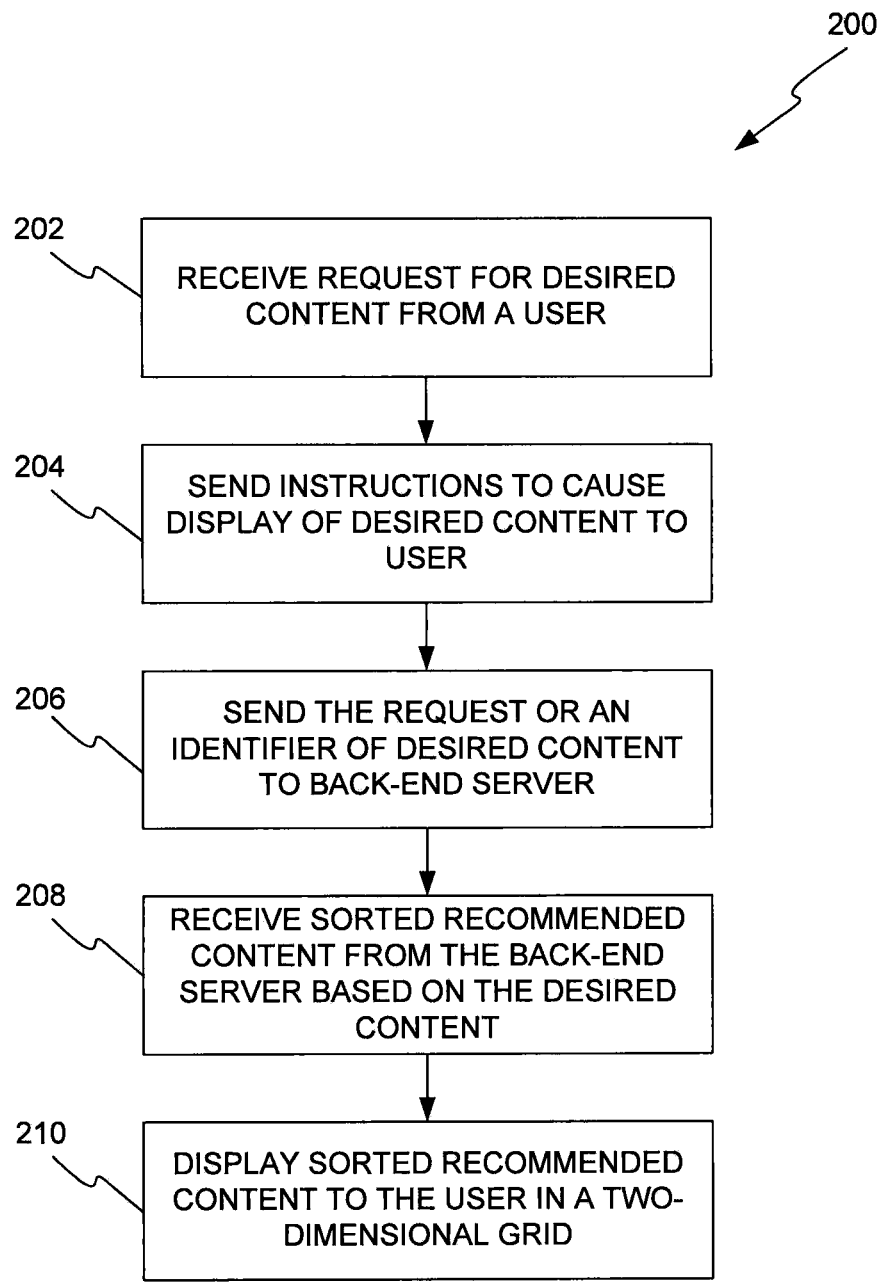
FIG. 2 depicts an exemplary method for displaying electronic media over the Internet, consistent with embodiments of the present disclosure.

FIG. 2 depicts an exemplary method 200 for displaying available or recommended electronic media content over the Internet. Method 200 may include receiving a request from a user, the request specifying desired electronic media content. (Step 202) For example, one of users 102 may interact with web servers 104 and/or 152 to request a desired electronic media content item over the Internet 101. The request may be made by a user starting to type a query into a search box, completing the typing of a query into the search box, or selecting a button or other visual user element, etc. corresponding to a name or topic of electronic media content. In one embodiment, when a user starts to type the name of a website, television channel, or television show into the query box, the programming guide may display a two-dimensional grid of search results that are all categorized in relation to that television channel or show, without displaying additional columns of unrelated content. Results listed in the grid of related content could be ranked or sequenced according to relevancy, recency, popularity, etc. Either or both of web servers 104, 152 may then send instructions to cause the display the desired media content item to the user 102 by, for example, sending or streaming a file over the Internet 101. (Step 204) Web servers 104 may then send the request or an identifier associated with the desired media content item to back-end servers 106. (Step 206) For example, web servers 104 may send a name or ID number associated with the desired media content item to back-end servers 106. In one exemplary embodiment, the user 102 requests the content from web servers 104, which retrieve it from one or both of the web servers 152 and content database 154. Web servers 104 then send an ID of the requested content to back-end servers 106. In an alternative embodiment, web servers 104 simply forward the requests from users 102 to the back-end servers 106.

Optionally, one or more of the above-described steps may be modified or skipped. For example, in certain embodiments, requests from users 102 or associated ID numbers may be sent to back-end servers 106 (step 206) without displaying the desired electronic media content (step 204). Additionally, or alternatively, the display of the desired electronic media content (step 204) may be performed only in response to a selection or input from the user, such as after displaying the two-dimensional grid of the sorted recommended content (see step 210).

Upon the back-end servers 106 receiving a request or an ID of the desired content, back-end servers 106 may interface with intelligence database 108. For example, method 200 may further comprise receiving, by the web servers 104, sorted recommended content from the back-end servers 106 based on the desired content. (Step 208) For example, as will be described in more detail below, back-end servers 106 may call on intelligence database 108 to look-up one or more of: user preference information, user web history information, clickthru information, content item information, and content group information. Back-end servers 106 may then execute two collaborative filters or ranking algorithms based on the desired content and the information stored in the intelligence database 108. The output of the two collaborative filters may include a sorted subset of available content groups and a sorted subset of available content items for each of the groups, which may be sent to web servers 104. Web servers 104 may then send instructions to cause the display of the sorted recommended content to the user in a two-dimensional grid (Step 210).

Figure 3:
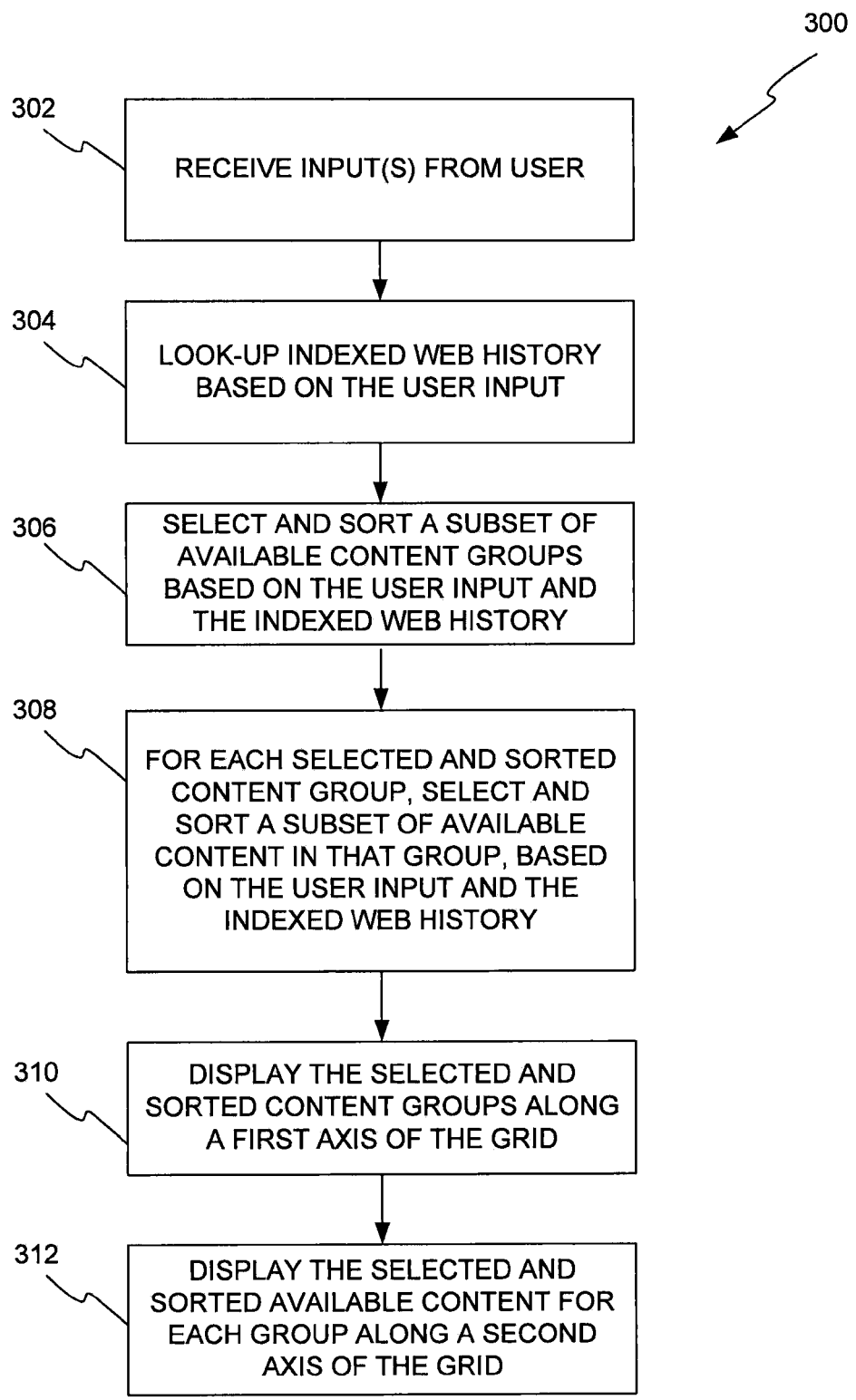
FIG. 3 depicts another exemplary method for displaying electronic media over the Internet, consistent with embodiments of the present disclosure.

FIG. 3 depicts another exemplary method 300 for displaying electronic media content over the Internet. Similar to method 200, method 300 may include receiving an input from a user. (Step 302) The input may include a request for desired electronic media content, as in method 200, or it may also include user preference or response information (e.g., "I like football."). Over time, user inputs may be collected and stored in intelligence database 108, in association with the user's IP address or other unique identifier. In addition, or alternatively, to a request for video content or other electronic media content, the user input may also include a request for a web page, a search query, or a topic of interest. Alternatively, the user may simply access web servers 104 to obtain recommended content, and the last URL visited by the user may be used as an input for looking-up indexed web history. In other words, the URL from which the user traveled to a URL hosted by the web servers may be used as a user input. In one embodiment, textual, video, audio, image, or meta data content associated with the last URL may be used as the user input.

Upon receipt of one or more inputs from a user, method 300 may include looking-up an indexed web history information from intelligence database 108, based on the user input. (Step 304) The indexed web history information may include web impression data, click data, action data, and/or conversion data. The indexed web history information may also include content item information and content group information. Method 300 may then include selecting and sorting a subset of available content groups based on the user input and the indexed web history. (Step 306) For example, method 300 may include executing the collaborative filter used for populating the horizontal content group axis, as described in more detail below. Method 300 may also include, for each selected content group, selecting and sorting a subset of available content in that group, based on the user input and the indexed web history, by executing the collaborative filter used for populating the vertical content item axis, as described in more detail below. (Step 308) Method 300 may then include instructing the display of the selected and sorted content groups along a first (e.g., horizontal) axis of the grid (Step 310); and instructing the display of the selected and sorted available content for each group along a second (e.g., vertical) axis for the grid. In certain embodiments, the grid is a two-dimensional WPG grid. Of course, other embodiments are possible and the axes of the grid may be switched, such that content groups are displayed along the vertical axis and content items are displayed along a horizontal axis for each content group.

Figure 4A:
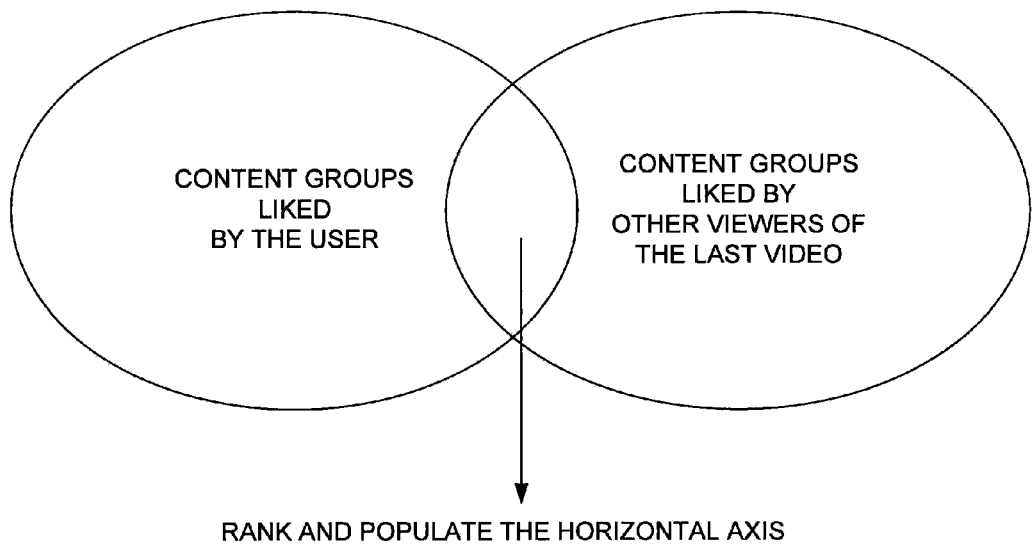
FIGS. 4A and 4B depict graphical representations of exemplary methodologies for selecting subsets of content groups and available content for displaying electronic media over the Internet, consistent with embodiments of the present disclosure.
Figure 4B:
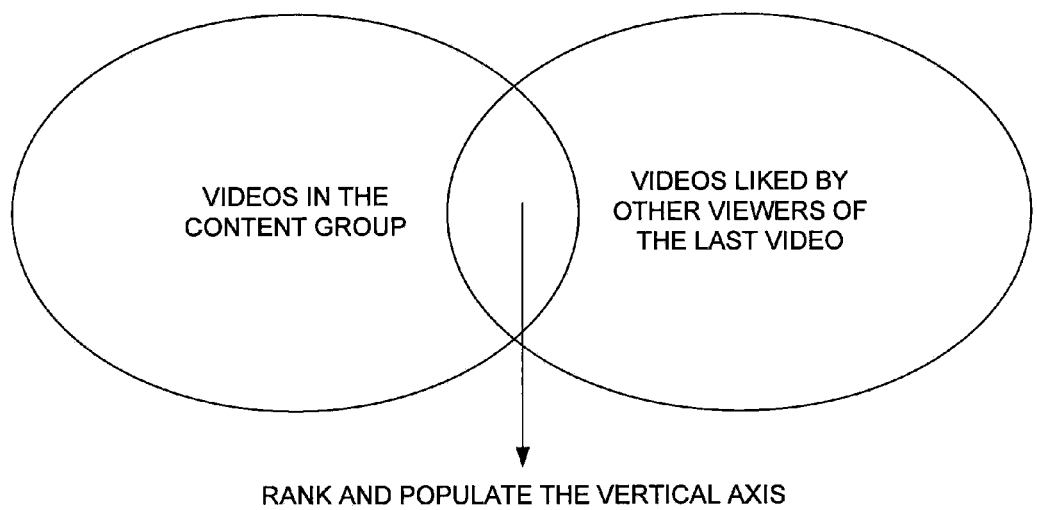

FIGS. 4A and 4B depict exemplary methodologies for selecting subsets of content groups and available content items, for displaying electronic media over the Internet. As represented in FIG. 4A, exemplary methods consistent with the present disclosure (including methods 200 and 300) may include generating a subset of content groups including the union of those content groups desired or liked by the user and those content groups desired or liked by other viewers of the last video. The subset of content groups may then be ranked by a content group collaborative filter as described below, and used to populate a horizontal axis of a WPG grid.

As represented in FIG. 4B, exemplary methods consistent with the present disclosure (including methods 200 and 300) may further include generating a subset of content items for each content group from the union of those videos in the content group and those videos liked and/or viewed by other viewers of the last video. The subset of content items may then be ranked by a content item collaborative filter as described below, and used to populate a vertical axis of the WPG grid for each content group.

Figure 5:
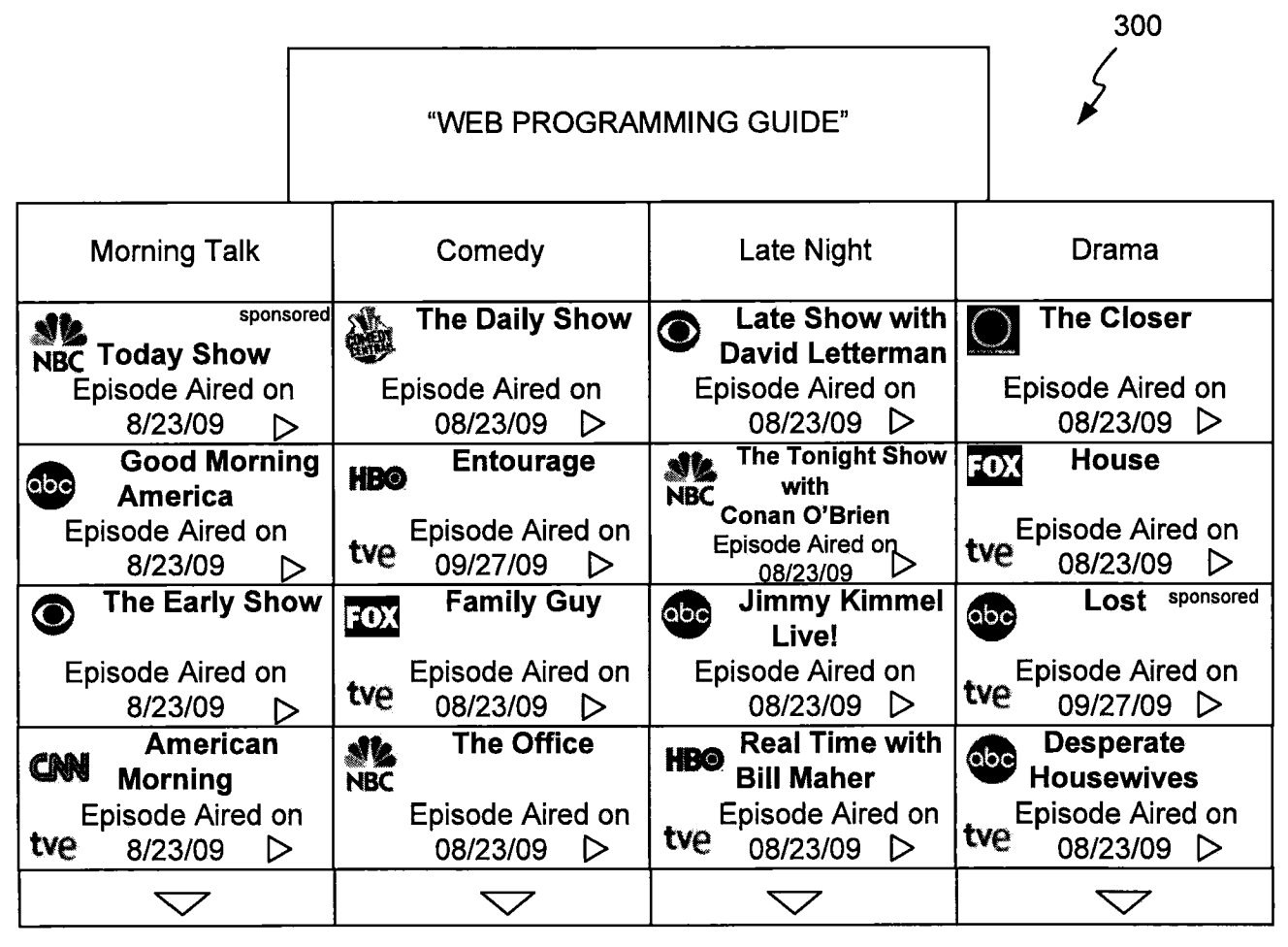

FIG. 5 depicts an exemplary two-dimensional WPG grid for displaying electronic media over the Internet, consistent with embodiments of the present disclosure. In this example, the horizontal axis is populated with the content groups or categories: "Morning Talk," "Comedy," "Late Night," and "Drama." However, there may be many more categories of content that the WPG could be populated with other than these four. The selection of categories may be performed using a content group collaborative filter, which may be an algorithm for selecting a subset of categories based on categories the user desires or likes and other categories of videos watched and/or liked by other viewers of the last video watched by a user. Further refinements to the selection of categories could be based on the most watched categories of content in the user's social circle (e.g. buddy list), or the history of categories of videos the user has watched.

The vertical axes for each content group displayed in FIG. 5 may be populated with suggested videos within each content group, based on an algorithm that incorporates another collaborative filter. In one embodiment, the collaborative filter may select a subset of videos in the same category that were viewed by other viewers of the last video. In other words, the most recently watched video prior to opening the WPG, may be used as the input to a collaborative filter that returns a list of videos (in the same category) watched by other users who viewed the same initial video. Exemplary embodiments of collaborative filters will now be described for use in populating the horizontal axis and vertical axis of a two-dimensional WPG.

Horizontal Axis

In various embodiment of the present disclosure, a first collaborative filter, or ranking algorithm may be used to select and order the content groups used to populate the horizontal axis of the grid. In one embodiment, the type of grouping includes subject-matter categories to which the content items belong. For example, categories could include: sports, news, comedy, drama, thriller, etc. In other embodiments, the type of grouping includes categorization by producers, distributors, actors, artists, websites, or any other attribute that is common to more than one content item. In one embodiment, a content item can belong to more than one group within a type of group. By way of example, a content item could be classified as both news and comedy if it intrinsically has elements of each. Further, a type of group may have an associated taxonomy. For example, a content item may belong to the group sports and also to the group football, a subgroup of sports.

In one embodiment, the collaborative filter, or ranking algorithm, used to sort order the content groups on a horizontal axis of the navigational grid may include a linear combination of one or more variables including: (1) recency ($G_r$), (2) clickthru popularity ($G_c$), (3) editorial popularity ($G_e$), (4)

rank popularity ($G_{rp}$), (5) taxonomic distance ($G_{td}$), and (6) collaborative filtering ($G_{cf}$). In one embodiment, each variable may be assigned a weighted value ($W_i$), and the content groups may be presented in order by group ranking ($G_T$), according to the following:

$$G_T = W_r G_r + W_c G_c + W_e G_e + W_{rp} G_{rp} + W_{td} G_{td} + W_{cf} G_{cf}$$

where: $0 < G_i < 1$ and: $1 = W_r + W_c + W_e + W_{rp} + W_{td} + W_{cf}$ $\Rightarrow 0 < G_T < 1$ It will be appreciated that the variables below are described generally. Any term used to determine $G_T$ for the horizontal axis could potentially be re-purposed for use on the vertical axis (or vice versa)—or for any other axis in the multi-dimensional case. For purposes of illustration, the group type "Category" is used in the following examples.

Term 1: Recency ($W_r G_r$)

The recency ranking of a content group may be calculated by normalizing the number of new content items in a group. For example, in the fall more new videos are added to the category "football" than in the summer. Likewise, in the summer more new videos are added to the category "baseball". The recency term may therefore be used to affect the ranking scheme by prioritizing categories that have more new content items compared to the steady state of the group.

Term 2: Clickthru Popularity ($W_c G_c$)

The clickthru popularity of a content group may be calculated by normalizing the number of times content items belonging to a given content group are viewed. For example, if videos in the "music" category are viewed (clicked on) more often than videos in the "news" category, the "music" category may receive a relative boost. A view of content or grouping of content is determined by a linear combination of weighted signals including the user selecting the content, the user watching the entire content, the time spent by the user hovering over an image or other representation of the content etc.

Term 3: Editorial Popularity ($W_e G_e$)

The editorial popularity of a content group may be the simple average rating given to a content group by a group of editors. For example, an editor may wish to boost a given category in the algorithm based on how popular the content is expected to be. This could be based on expected viewership for known brand names, previous Neilsen ratings, etc. The most popular content should approach $G_e = 1$. Unknown or unpopular content should approach $G_e = 0$. Optionally, the editorial popularity rank may also have a time decay component to give weight or more weight to more recent popularity information.

Term 4: Rank Popularity ($W_{rp} G_{rp}$)

The rank popularity of a content group is calculated by normalizing the average number of times the content group appears in the first $n_i$ content items returned using the ranking scheme described below for selecting content items, when the group restriction is not applied. In other words, $R_T$ is calculated as described below for $n_i$ content items, but without the restriction that all content items must belong to the same group. The group restriction may be applied on the horizontal axis in order to populate a content group column. The popularity of content groups may be calculated by iterating across all the items. For example, given 100 content items with the highest value of $R_T$, 60 may belong to the category "music," 30 to the category "news," and 10 to the category "sports." In this case, $G_{rp}$ equals 0.6, 0.3, 0.1 for the categories "music," "news," and "sports," respectively.

Term 5: Taxonomic Distance ($W_{cf} G_{cf}$)

The taxonomic distance between content groups may have a positive or negative influence on the rank of a group when compared to another group. For example, if the first (or default category) is sports, then child categories of sports (e.g. football and baseball) should be ranked lower than siblings of the category, sports (e.g. news).

Term 6: Collaborative Filter ($W_{cf} G_{cf}$)

The collaborative filter term may be calculated for a content group in substantially the same way as will be described below in relation to the vertical axis content items, except that content groups are used in place of content items.

Vertical Axis

In one embodiment, the vertical axis of the navigation grid may be populated for each selected content group with a list of content items that may include any combination of: Web videos, single television shows, a television series, movies, images, audio clips, streaming media, or web sites. The content items may be assigned to one or more of the content groups ranked in the horizontal axis and ordered within a group along the vertical axis using a ranking algorithm as described below.

In one embodiment, the ranking algorithm used to order the content items may be a linear combination of several weighted variables including: (1) recency ($R_r$), (2) clickthru popularity ($R_c$), (3) editorial popularity ($R_e$), (4) video quality ($R_v$), (5) textual relevance ($R_t$), (6) video (image and audio) relevance ($R_{cr}$), (7) user rating ($R_{ur}$), and (8) collaborative filtering ($R_{cf}$). In one embodiment, each variable is assigned a weighted value ($W_i$), and each content item is given a ranking value $R_T$ according to the following:

$$R_T = W_r R_r + W_c R_c + W_e R_e + W_v R_v + W_t R_t + W_{cr} R_{cr} + W_{ur} R_{ur} + W_{cf} R_{cf}$$

where: $0 < R_i < 1$ and: $1 = W_r + W_c + W_e + W_v + W_t + W_{cr} + W_{ur} + W_{cf}$ $\Rightarrow 0 < R_T < 1$ As described below, the textual relevance, video relevance, and collaborative filtering terms may be a function of both the content item and/or website from which the navigation grid was invoked and/or the history of content items viewed by the user. For example, collaborative filtering $R_{cf}$ depends on the history of content items the user has viewed. Text relevancy, $R_t$, is determined by searching for content items with similar text to the metadata associated with the website or previous content item from which the navigation grid was launched. Video relevancy, $R_v$, is determined by searching for content items with similar audio or image content as the previous content item from which the navigation grid was launched.

In one embodiment, the term weights, $W_i$, are adjusted depending on context. For example, if the navigation grid is used in a news context, the recency term, $R_r$, will have relatively more weight than the other terms in the ranking scheme. In one embodiment, each of the exemplary weighted variables may be defined substantially as follows:

Term 1: Recency Ranking:

As with recency of content groups, the recency ranking of a content item may be used to prioritize newer content items compared to the average aged content items, as follows:

$$R_r \begin{cases} 1 - \frac{1}{t_e}(d_c - d_F), & \text{For } (d_c - d_F) < t_e \\ 0, & \text{For } (d_c - d_F) > t_e \end{cases}$$

where:
$t_e$=expiration time (perhaps ~30 days)
$d_c$=current date
$d_F$=date found Term 2: Clickthru Popularity Ranking:

Similar to clickthru ranking for content groups, the clickthru ranking of a content item may be used to prioritize more popular content items compared to average-popularity content items, based on a clickthru popularity ranking, $R_c$, calculated as follows:

$R_c = W_{cpm}R_{cpm} + W_{cph}R_{cph} + W_{cpd}R_{cpd}$, where:

$$R_{cpm} = \text{clicks per minutes ranking} = \frac{CPM}{\underset{\text{over all items}}{\text{Max}(cpm)}}, (0 < R_{cpm} < 1)$$

$$R_{cph} = \text{clicks per hour ranking} = \frac{CPH}{\underset{\text{over all items}}{\text{Max}(cph)}}, (0 < R_{cph} < 1)$$

$$R_{cpd} = \text{clicks per day ranking} = \frac{CPD}{\underset{\text{over all items}}{\text{Max}(cpd)}}, (0 < R_{cpd} < 1)$$

and $1 = W_{cpm} + W_{cph} + W_{cpd}$

To implement the clickthru popularity rating, the following fields may be stored in relation to each content item, e.g., video:

TOTAL_CLICKS=the running tally of clicks that this item has seen since found;
CPM=clicks per minute;
CPM_COUNT_BUFFER=running tally of clicks on this item since CPM_LAST_CALC;
CPM_LAST_CALC=the time when CPM was last calculated and CPM_COUNT_BUFFER was flushed;
Similarly: CPH, CPH_COUNT_BUFFER, CPH_LAST_CALC are calculated for clicks-per-hour, and CPD, CPD_COUNT_BUFFER, CPD_LAST_CALC are calculated for clicks-per-day.

These fields can be calculated and updated as follows:

For every user with cookies enabled on their web browser or other application, each clicked item is stored anonymously in a cookie. Upon a subsequent request to system 100 and/or third-party content provider 150 (during that same session), the clickthru data in the cookie is processed as follows:

For every item clicked, increment TOTAL_CLICKS, CPM_COUNT_BUFFER, CPH_COUNT_BUFFER, and CPD_COUNT_BUFFER by 1.

For CPM, if CURRENT_TIME−CPM_LAST_CALL>1 minute;
CPM=CPM_COUNT_BUFFER/(CURRRENT_TIME−CPM_LAST_CALC)
reset CPM_COUNT_BUFFER to 0.
set CPM_LAST_CALC to CURRENT_TIME
Increment values for CPD and CPH in a similar manner.
Once this is complete, the user's browser cookie may be flushed to eliminate all cached clickthrus.

Term 3: Editorial Popularity Ranking:

Each content item may be assigned a value for "editorial rank" based on how popular the content is expected to be. This could be based on expected viewership for known brand names, previous Neilsen ratings, etc. The most popular content should approach $R_e$=1. Unknown or unpopular content should approach $R_e$=0. Optionally, the editorial popularity rank may also have a time decay component to give weight or more weight to more recent popularity information.

Term 4: Video Quality ($R_v$)

The video quality $R_v$ of a content item may be determined and incorporated into the ranking such that higher quality videos are prioritized over lower quality videos. For example, videos may be ranked based on their bit rate responsiveness, resolution, or any other suitable indicator of video quality.

Term 5: Text Relevance ($W_t R_t$)

The webpage that the WPG navigation grid is launched from and the last video that was played by the user may serve to provide context and textual metadata that can be used to select new groups for the horizontal axis, as well as new items to display in the vertical axis based on a text similarity score. In order to calculate $R_t$, the following steps may be performed. Firstly, all the textual metadata associated with the webpage or last video watched may be collected. Each word in the textual metadata may be collected from a field of that item, i.e., title or description. Each item may have a particular hierarchy of fields that represents the importance of that field to the score given for the word similarity. This may represent the field importance weight $fw_i$, and $\Sigma_i(fw_i) = 1$.

For each word collected, the method may first determine if the word is a common word, or a stop word. If it is, it may be discarded for the purpose of this calculation. The method may then determine the significance of the word for use in the calculation, by counting the number of times the word occurs in each field of the metadata, dividing by the total length of the field, multiplying by the field importance weight, and adding this term up for each field. This will provide a word significance score, as follows:

$w_s = \Sigma_i(fw_i * \text{count}(w_i f_i) / \text{length}(f_i))$.

The method may then include ranking the words by word significance score in descending order. The top n words in this ranking will be an n-tuplet ($w_1, w_2 \ldots w_n$) that represents the main concepts for this item. One can repeat this for phrases, and if phrases with multiple words appear more than once, then they are given a higher importance proportional to their length.

Let "B" be the set of all items that are available to be matched, and let a∈B be the item metadata used as the seed to calculate the text relevancy term for every b∈B. For each b∈B, calculate the significant word n-tuplet as detailed above. Calculate the significant word n-tuplet for "a" as well. Then calculate the similarity score between the n-tuplets "a" and "b" as follows:

Let $a_i$ be a word at index I in the n-tuplet a. Then, if $a_i = b_j$, i.e., the word $a_i$ is at the index j in the n-tuplet b, then the distance score between the same word in the n-tuplets is $1 - |i - j|/n$. This distance is a maximum of 1, if the word is at the same position in both n-tuplets. If the word is position 1 in a and in position n in b, then the score will be 1/n, which is the lowest non-zero distance score possible. The similarity score may then be obtained by summing over all the words in the n-tuplet a, and dividing by 1/n, as follows:

$R_t = S(a, b) = (1/n)\Sigma_a(1 - |i - j|/n)$

This score will be 1 if the n-tuplets are exactly the same. If there are no words in common, then the score will be 0. This score depends largely on the initial calculation of the significant word n-tuplets, and the weights given to each field of the item. Textual relevance can be extended to include metadata from the website's domain or blog.

Term 6: Video (Image and Audio) Relevance ($R_{vr}$)

Video relevancy, $R_{V}$, may be determined by searching for content items with similar audio or image content as the previous content item from which the navigation grid was launched.

Term 7: User Rating ($R_{ur}$)

User rating, $R_{ur}$, may be calculated based on feedback received by a user over time. For example, a user may from time to time indicate a level of interest in various content.

Term 8: Collaborative Filter ($W_{cf}R_{cf}$)

In order to calculate $R_{cf}$, the following steps are performed. A listing of videos, individual television shows, or a television series that a user has watched (collectively viewed items) is stored in a data repository, such as intelligence database 108. When the navigation grid is invoked, the most recent $n_i$ viewed items is used as the input for recommending other viewed items using a collaborative filer. In one embodiment, $R_{cf}$ is calculated on per user basis using the following scheme.

First, calculate the distance between user i and all other users, j: $D_{i,j}$=distance between user i+j=$(n_i-n_{ij})/n_i$, where $n_i$ is the number of viewed items user i has stored, and $n_{i,j}$ is the number of user i's viewed items that match viewed items of user j. If all of user i's viewed items match a viewed item of user j, then $D_{i,j}$=0. If none match, $D_{i,j}$=1. Similarly, a measure of the similarity between user i and j can be calculated as follows:

$S_{i,j}$=similarity between users i and j=$(1-D_{i,j})$, where $S_{i,j}$=1 when the users are completely similar, and 0 when there are no similar viewed items between users.

Second, select the K-Nearest Neighbors to user i based on the similarity ranking. For example, assuming user i has three viewed items:

For: User i
Viewed Items: ITEMID=103; ITEMID=107; ITEMID=112
⇨ $n_i$=3

K-Nearest Neighbors can be selected as follows:

| User ID (j) | $n_{i,j}$ | $D_{i,j}$ | $S_{i,j}$ | Viewed Items ID |
|---|---|---|---|---|
| 1 | 1 | 0.66 | 0.33 | 101, 102, 103, 110, 104 |
| 2 | 2 | 0.33 | 0.66 | 103, 104, 105, 106, 107 |
| 3 | 0 | 1 | 0 | 101 |
| 4 | 3 | 0 | 1 | 103, 104, 107, 112 |
| 5 | 2 | 0.33 | 0.66 | 106, 107, 109, 110, 111, 112 |
| 6 | 1 | 0.66 | 0.33 | 103, 104 |

Re-ranking the users by decreasing similarity:

| | User ID | $S_{i,j}$ | Viewed Items Not Already Stored by User i |
|---|---|---|---|
| | 4 | 1 | 104 |
| K-Nearest Neighbors, where K = 4 | 2 | 0.66 | 104, 105, 106 |
| | 5 | 0.66 | 106, 109, 110, 111 |
| | 1 | 0.33 | 101, 102, 110, 104 |
| | 6 | 0.33 | 104 |
| | 3 | 0 | 101 |

From this ordered list, the K-Nearest Neighbors are the first K items (rows in the previous table).

Third, the popularity of each item is determined from the K-Nearest Neighbors. This can be calculated from the fraction of the K neighbors that have item/in their viewed item list.

Specifically:

| KNN = K-Nearest Neighbors (for K = 4): | | |
|---|---|---|
| User ID | Similarity to User i | Unviewed Items by User i |
| 4 | 1 | 104 |
| 2 | 0.66 | 104, 105, 106 |
| 5 | 0.66 | 106, 109, 110, 111 |
| 1 | 0.33 | 101, 102, 110, 104 |

$$P_I = \frac{\text{popularity of item } I \text{ among K-Nearest Neighbors to user i}}{} = \frac{\text{number of occurrences of item } I}{K}$$

Therefore,

| Item ID | Users with This Item | $P_I$ | $S_{max\,I}$ |
|---|---|---|---|
| 104 | 4, 2, 1 | 0.75 | 1 |
| 106 | 2, 5 | 0.5 | 0.66 |
| 110 | 5, 1 | 0.5 | 0.66 |
| 105 | 2 | 0.25 | 0.66 |
| 109 | 5 | 0.25 | 0.66 |
| 111 | 5 | 0.25 | 0.66 |
| 101 | 1 | 0.25 | 0.33 |
| 102 | 1 | 0.25 | 0.33 |

Where: $S_{max,I}$=Maximum similarity across all users with item I in their viewed item list. For example, Item Id 105 has a $S_{max}$ of 0.66 because it appears in the second row of KNN similarity table for User i. And, Popularity=1 when all KNN contain item I, and $P_1$=0 when no KNN contain item I.

Fourth, the rank of each item I is calculated using a weighted sum of $P_1$ and $S_{maxI}$. The weighting factor is calculated as a function of $n_i$ since the relative importance of user similarity, as compared to popularity, increases with the number of viewed items. In other words, if a user has viewed only one item, $n_i$=1, then the similarity will be either 0 or 1, and therefore it does not have much meaning. Therefore, when $n_i$ is small, similarity should be weighed less than popularity.

For a given item I:

$R_{cf,I}=W_{sim}(S_{max,I})+(1-W_{sim})P_I.$ where:

$$W_{sim} = \text{similarity weighting factor} = C_{maxsim}\left(1 - \frac{1}{1+n_i}\right)$$

where:

$0 \le C_{maxsim} \le 1$

In other words, $R_{cf}$ is a weighted sum of the maximum user similarity for item I and the popularity of item I among KNN such that $0 \le R_{cf} \le 1$. $C_{max\,sim}$ should be set to the value that the similarity weighting factor should approach as $n_i$ becomes large. Now, for each new item in KNN, we can calculate the Rank $R_{cf}$:

| Item ID | $P_I$ | $S_{max\,I}$ | $R_{cf,I}$ |
|---|---|---|---|
| 104 | .75 | 1 | 0.86 |
| 106 | .5 | 0.66 | 0.57 |
| 110 | .5 | 0.66 | 0.57 |
| 105 | .25 | 0.66 | 0.43 |
| 109 | .25 | 0.66 | 0.43 |
| 111 | .25 | 0.66 | 0.43 |

-continued

| Item ID | $P_I$ | $S_{max\,I}$ | $R_{cf,\,I}$ |
|---------|-------|--------------|--------------|
| 101 | .25 | 0.33 | 0.29 |
| 102 | .25 | 0.33 | 0.29 |

Assume $C_{max\,sim} = 0.6$.
For $n_i = 3$:
$\Rightarrow W_{sim} = 0.45$
$(1 - W_{sim}) = 0.55$ Finally, in order to reduce the number of computations required to evaluate the collaborative filter term, a number of techniques can be employed. By way of example, additional data about the user (gender, nationality, location, social graph) may be used to constrain the number of user comparisons when calculating the distance $D_{i,j}$.

If the navigation grid is launched from a web page that does not contain a video, the text relevancy term, $R_t$, is a function of the content of the web page, and the collaborative filter term, $R_{cf}$, is a function of the co-visitation of users who have viewed both the web page and specific videos on the web. By way of example, if a user visits a web page and also watches a series of videos, a subsequent visitor to the web page may be interested in those same videos. A collaborative filter associating web pages and videos may be used to evaluate the $R_{cf}$ term in this case.

In addition to the textual relevance of a given web page and the co-visitation of a given web page with other specific videos on the web, additional context can be derived from the entire website (an entire web domain or a blog) in a similar manner. For example, $R_t$, is supplemented with text relevant to the entire website. $R_{cf}$ includes co-visitation of the website itself with other specific videos on the web.

If the navigation grid is launched outside of any context (that is, nothing is known about either the user or the last webpage/video viewed), then the relevance and collaborative filter terms evaluate to 0 and do not contribute to the ranking of videos.

Figure 6:
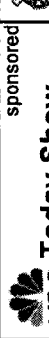
FIG. 6 is an is an illustration of an exemplary three-dimensional grid for displaying electronic media over the Internet, consistent with embodiments of the present disclosure.

FIG. 6 depicts an exemplary embodiment of a three-dimensional "WPG cube" that includes an additional dimension of content information. For example, the WPG cube may display any additional layer of information about content otherwise displayed in the two-dimensional grid, such as episode options (as depicted), specific scenes or chapters of the content, a picture or logo associated with the content, etc. In one embodiment, the WPG cube may consist of a plurality of smaller boxes, that can be individually manipulated with each box representing a content item. Each box may have a different type or layer of content displayed on one of its six faces. A user may view the content by dispensing with content boxes that the user does not wish to view, or rotating or flipping over boxes to see content information on various faces of each box. In one embodiment, the boxes may be displayed in a translucent manner, and the user may selectively view additional information by zooming in towards and/or away from the boxes.

Thus, in either of the exemplary embodiments depicted in FIGS. 5 and 6, the WPG may be displayed in association with a graphical user interface (GUI) having visual elements that the user can select and manipulate using an input device. For instance, the WPG may be displayed in association with scroll bars, arrows, "radio" buttons, search fields, and/or any other element that the user can manipulate to adjust a display of the WPG. The input device used by the user may include a mouse, keyboard, touch-screen, accelerometer, remote control, mobile device, joystick, and/or video game controller.

Figure 7:
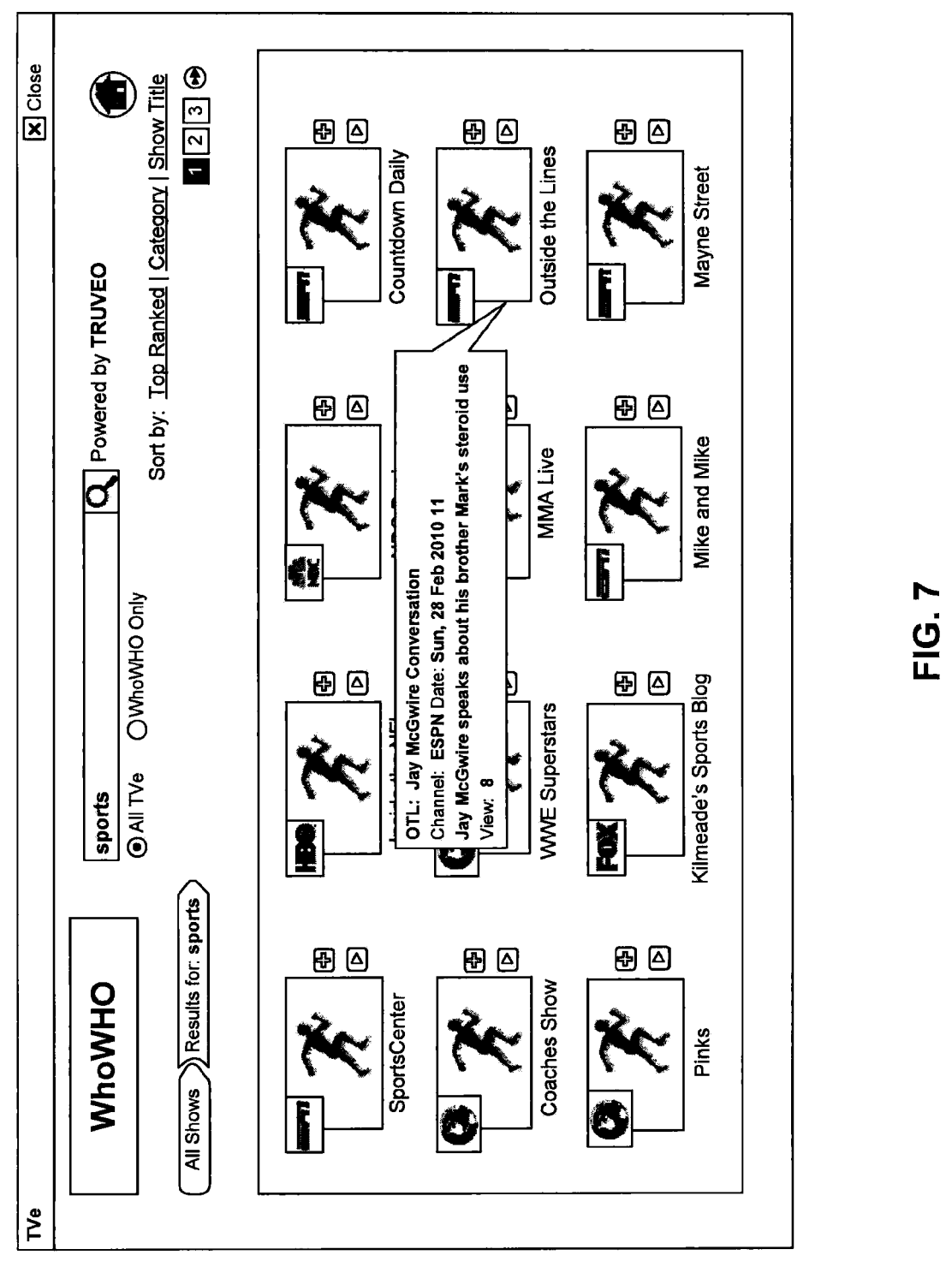
Figure 8:
FIG. 8 shows a screenshot of a web programming grid, in which a query in a search bar yields query-related results and navigational tab.

FIG. 7 shows a screenshot of a web programming grid, in which a query in a search bar yields query-related results and navigational tab. For example, when a user types "sports" into a query bar, sports-related videos populate the two dimensional grid, and a sports-related navigational tab appears in the top left-hand corner of the grid. A user may select a method of sequencing or ranking videos or media content populating the grid, e.g., by "top ranked," "category," "show title," or any other category such as "most comments," "highest quality," etc. In one embodiment, when a user selects a video in the grid, the sports-related navigational tab will remain in place even though a user may be directed to a video-specific web page, so the user can easily navigate back to the sports-related search results page. Likewise, FIG. 8 shows a screenshot of a web programming grid, in which a query in a search bar yields query-related results and navigational tab. In this exemplary embodiment, the screenshot displays "tv"-related search results. Of course, the web programming guide may display any suitable type of electronic media content in a grid.

Figure 9:
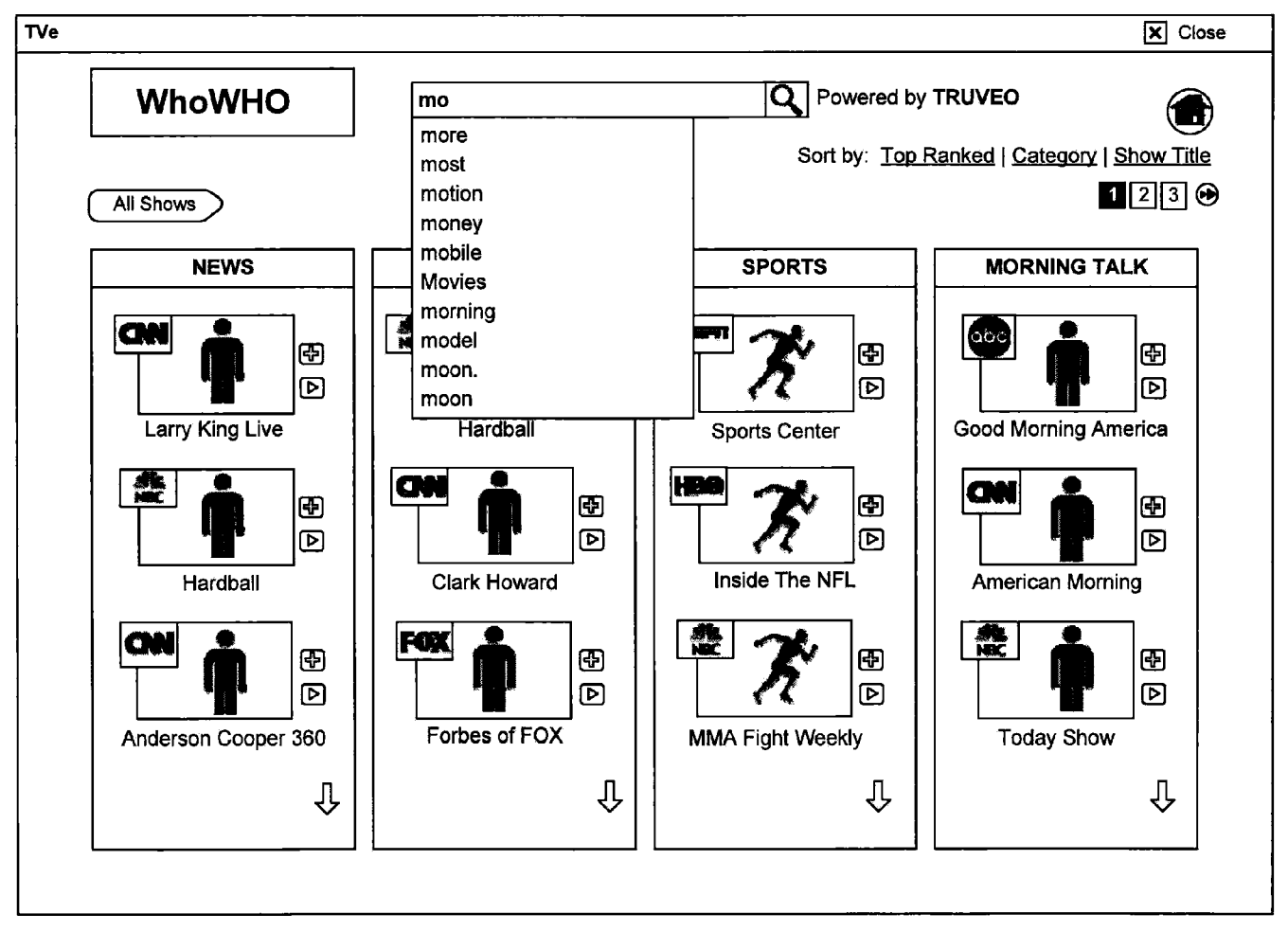

FIG. 9 shows a screenshot of a web programming guide in which a search bar starts displaying possible queries upon a partial entry of text. Such a search bar display may be used in relation to any of the embodiments described herein. In one embodiment, upon typing partial text into the search bar, the grid may be populated passed on the partial text. Thus, as additional text is entered, the selection of media content in the grid may change to reflect the likely interests of the user entering the query.

Figure 10A:
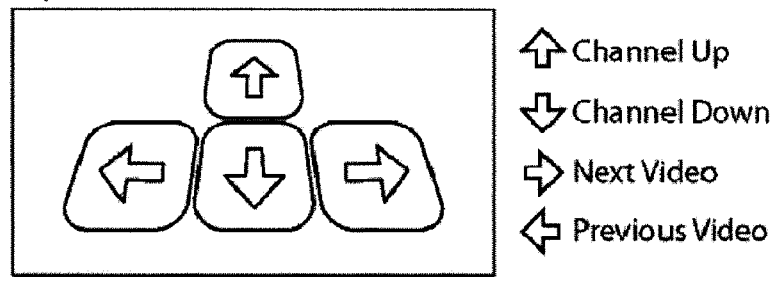
FIGS. 10A and 10B illustrate exemplary controls for navigating through the web programming guide, consistent with embodiments of the present disclosure.
Figure 10B:
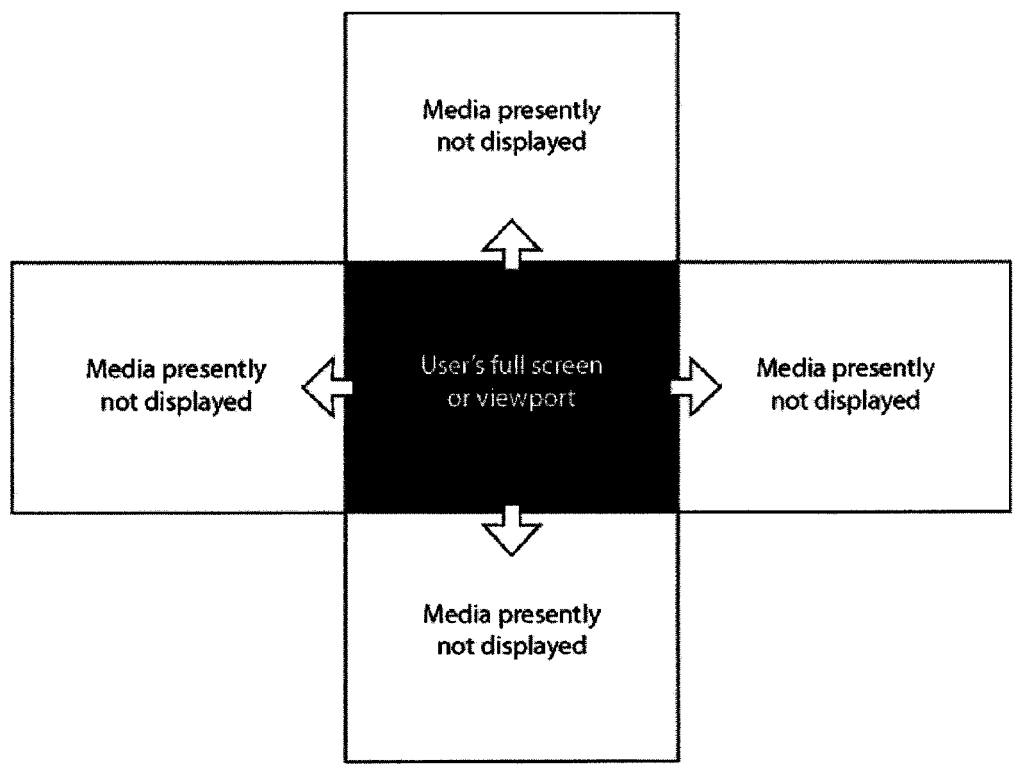

FIGS. 10A and 10B illustrate exemplary controls for navigating through a web programming guide, consistent with embodiments of the present disclosure. In these examples, arrow keys serve to navigate through the grid, without visually displaying a grid. As shown in FIG. 10B, the user may only view a single media piece within the user's viewport, but may be presented with additional content as if that content had been previously displayed above, below, or to the left or right from the previously displayed content.

Figure 11A:
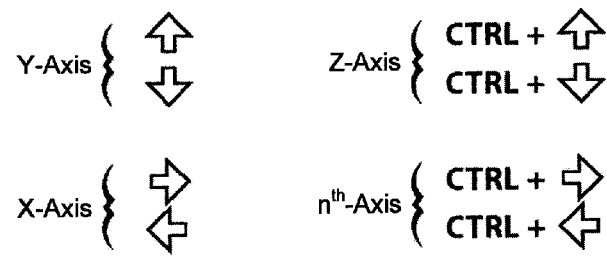
FIGS. 11A and 11B illustrate the exemplary dimensions available by introducing key combinations for manipulating the web programming guide, consistent with embodiments of the present disclosure.
Figure 11B:
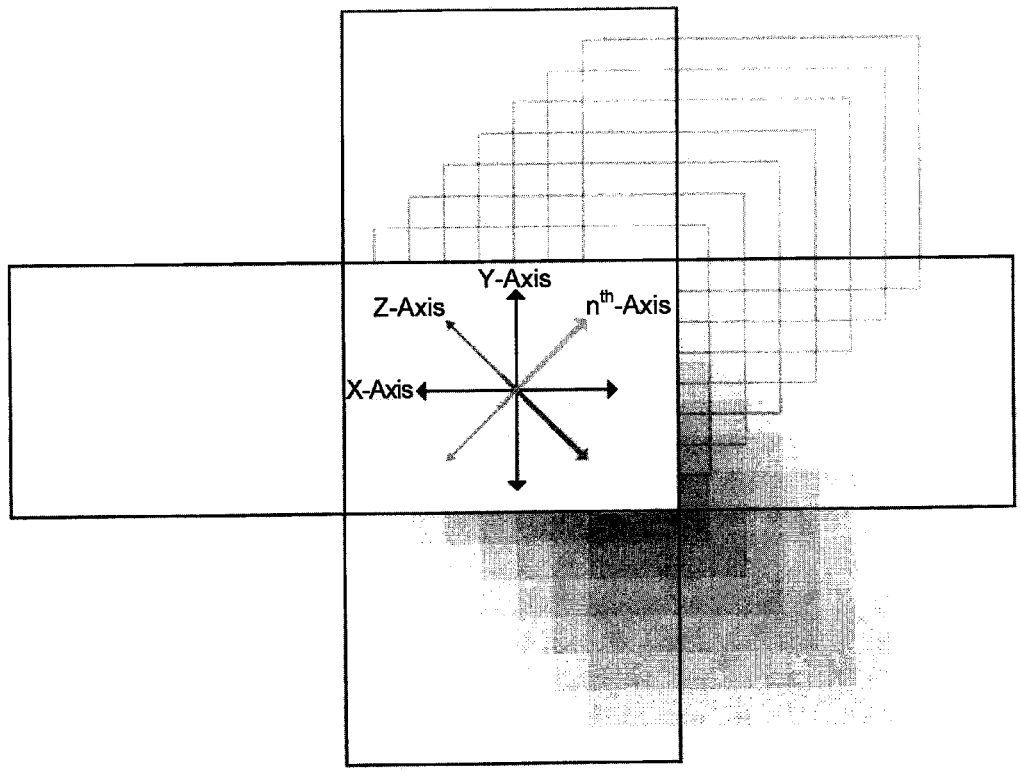

FIGS. 11A and 11B illustrate the limitless dimensions available by introducing key combinations. For example, FIGS. 11A and 11B depict how "Left/Right" arrows may represent the first dimension on the X axis, "Up/Down" arrows may represent the second dimension on the Y axis, "Ctrl+Up/Ctrl+Down" keystrokes may represent the third dimension on the Z axis, and "Ctrl+Left/Ctrl+Right" etc. keystrokes may represent infinitely deep dimensional possibilities.

Figure 12A:
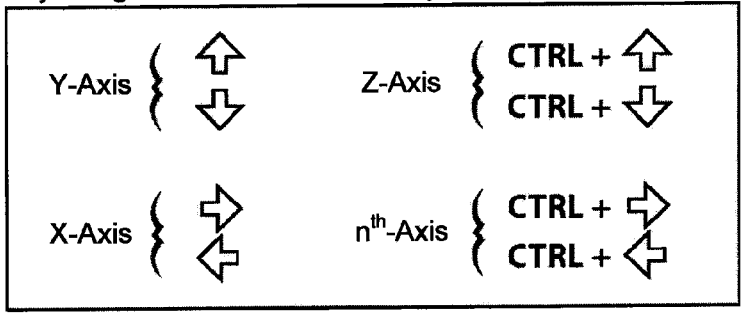
FIGS. 12A, 12B, and 12C illustrate exemplary user interfaces for for navigating through the web programming guide, consistent with embodiments of the present disclosure.
Figure 12B:
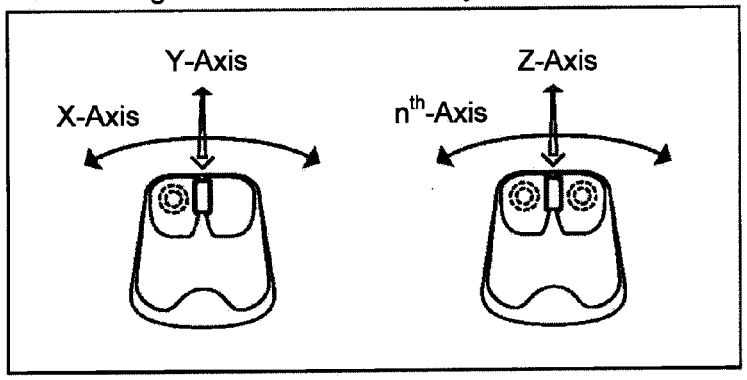
Figure 12C:
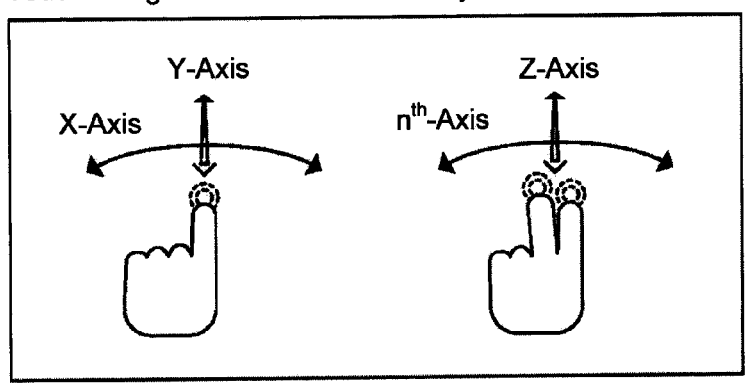

FIGS. 12A-12C illustrate exemplary mechanisms for user interfaces. The user interfaces of FIGS. 12A-12C may be implemented consistent with the arrow keys of FIGS. 11A and 11B, but controlled by alternative mechanisms, such as the click and drag of a mouse, or on touch sensitive devices, the sliding of a finger. Depending on the case, multiple button clicks or multiple finger touches may switch the dimension being navigated, extending the paradigm beyond two dimensions.

FIGS. 13A and 13B illustrate exemplary responses of the system to directionality within a dimension, depending on prior actions. Just as a "channel surfer" could proceed to the "next video" by clicking upward or downward, directionality within the exemplary web programming guide described herein may be contextually dependent.

Embodiments of the present disclosure may include a method or process, an apparatus or system, or computer software on a computer medium. It is intended that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components. Other implementations are within the scope of the following exemplary claims.

It will be apparent to those skilled in the art that various modifications and variations can be made to the systems and methods disclosed herein. It is intended that the disclosed embodiments and examples be considered as exemplary only, with a true scope of the present disclosure being indicated by the following claims and their equivalents.

What is claimed is:

1. A method for displaying electronic multimedia content to a user, the method comprising:
   receiving a request from a user, the request specifying electronic media content desired by the user;
   analyzing, using at least one processor, an indexed web history of a plurality of other users based on the request for desired content;
   selecting a subset of available content groups, based on the request for desired content and the indexed web history, wherein the subset of available content groups include content groups desired or liked by the user and content groups desired or liked by other viewers of a last video watched by the user;
   sorting the selected subset of available content groups based on at least one of popularity and recency;
   selecting, for each selected and sorted content group, a subset of available content based on the desired content and the indexed web history, wherein the subset of available content in each selected and sorted content group include contents that were viewed by other viewers of the last video watched by the user;
   sorting, for each selected and sorted content groups, the selected contents based on at least one of popularity and recency;
   providing instructions to display, to the user, the selected and sorted subset of content groups along a first axis of a two-dimensional grid in the order of at least one of popularity and recency of the content groups; and
   further providing instructions to display, to the user, the selected and sorted subset of available content for each content group along a second axis of the two-dimensional grid in the order of at least one of popularity and recency of the content.

2. The method of claim 1, wherein the request specifies at least a portion of a video that the user desires to watch.

3. The method of claim 1, wherein the indexed web history includes one or more of: cookie data, impression data, click data, action data, conversion data, user information, content item information, and content group information.

4. The method of claim 1, wherein the subset of available content groups is sorted in an order of a ranking value calculated based on one or more of recency, clickthru popularity, editorial popularity, rank popularity, taxonomic distance, and collaborative filtering based on indexed web history.

5. The method of claim 1, wherein the a subset of available content is sorted for each content group in an order of a ranking value calculated based on one or more of: recency, clickthru popularity, editorial popularity, video quality, textual relevance, video relevance, user rating and collaborative filtering based on indexed web history.

6. A method for displaying electronic multimedia content to a user, the method comprising:
   receiving a URL for a web page previously visited by a user;
   analyzing, using at least a processor, an indexed web history of a plurality of other users based on the URL;
   selecting a subset of available content groups, based on the URL and the indexed web history, wherein the subset of available content groups include content groups desired or liked by the user and content groups desired or liked by other viewers of a last video watched by the user;
   sorting the selected subset of available content groups based on at least one of popularity and recency;
   selecting, for each selected and sorted content group, a subset of available content based on the URL and the indexed web history, wherein the subset of available content in each selected and sorted content group include contents that were viewed by other viewers of the last video watched by the user;
   sorting, for each selected and sorted content groups, the selected contents ased on at least one of popularity and recency;
   providing instructions to display, to the user, the selected and sorted subset of content groups along a first axis of a two-dimensional grid in the order of at least one of popularity and recency of the content groups; and
   further providing instructions to display, to the user, the selected and sorted subset of available content for each content group along a second axis of the two-dimensional grid in the order of at least one of popularity and recency of the content.

7. The method of claim 6, wherein the indexed web history includes one or more of: cookie data, impression data, click data, action data, conversion data, user information, content item information, and content group information.

8. The method of claim 6, wherein the subset of available content groups is sorted in an order of a ranking value calculated based on one or more of recency, clickthru popularity, editorial popularity, rank popularity, taxonomic distance, and collaborative filtering based on indexed web history.

9. The method of claim 6, wherein the a subset of available content is sorted for each content group in an order of a ranking value calculated based on one or more of: recency, clickthru popularity, editorial popularity, video quality, textual relevance, video relevance, user rating and collaborative filtering based on indexed web history.

10. A system for displaying electronic multimedia content to a user, the system comprising:
    a storage device configured to store instructions; and
    at least one processor configured to execute the instructions to:
    receive a request from a user, the request specifying desired electronic media content;
    analyze an indexed web history of a plurality of other users based on the request for desired content;
    select a subset of available content groups based on the request for desired content and the indexed web history, wherein the subset of available content groups include content groups desired or liked by the user and content groups desired or liked by other viewers of a last video watched by the user;
    sort the selected subset of available content groups based on at least one of popularity and recency;
    select, for each selected and sorted content group, a subset of available content based on the desired content and the indexed web history, wherein the subset of available content in each selected and sorted content group include contents that were viewed by other viewers of the last video watched by the user;

sort, for each selected and sorted content groups, the selected contents based on at least one of popularity and recency;

populate a first axis of a two-dimensional grid with the selected and sorted content groups in the order of at least one of popularity and recency of the content groups; and populate a second axis of the two-dimensional grid with the selected and sorted available content for each content group in the order of at least one of popularity and recency of the content.

11. The system of claim 10, wherein the request specifies a video that the user desires to watch.

12. The system of claim 10, wherein the indexed web history includes one or more of: cookie data, impression data, click data, action data, conversion data, user information, content item information, and content group information.

13. The system of claim 10, wherein the subset of available content groups is sorted in an order of a ranking value calculated based on one or more of recency, clickthru popularity, editorial popularity, rank popularity, taxonomic distance, and collaborative filtering based on indexed web history.

14. The system of claim 10, wherein the a subset of available content is sorted for each content group in an order of a ranking value calculated based on one or more of: recency, clickthru popularity, editorial popularity, video quality, textual relevance, video relevance, user rating and collaborative filtering based on indexed web history.

15. A system for displaying electronic multimedia content to a user, the system comprising:

a storage device configured to store instructions; and at least one processor configured to execute the instructions to:

receive a URL for a web page previously visited by a user;

analyze an indexed web history of a plurality of other users based on the URL;

select a subset of available content groups, based on the URL and the indexed web history, wherein the subset of available content groups include content groups desired or liked by the user and content groups desired or liked by other viewers of a last video watched by the user;

sort the selected subset of available content groups based on at least one of popularity and recency;

select, for each selected and sorted content group, a subset of available content based on the URL and the indexed web history, wherein the subset of available content in each selected and sorted content group include contents that were viewed by other viewers of the last video watched by the user;

sort, for each selected and sorted content groups, the selected contents based on at least one of popularity and recency;

provide instructions to display, to the user, the selected and sorted subset of content groups along a first axis of a two-dimensional grid in the order of at least one of popularity and recency of the content groups; and further provide instructions to display, to the user, the selected and sorted subset of available content for each content group along a second axis of the two-dimensional grid in the order of at least one of popularity and recency of the content.

16. The system of claim 15, wherein the request specifies a video that the user desires to watch.

17. The system of claim 15, wherein the indexed web history includes one or more of: cookie data, impression data, click data, action data, conversion data, user information, content item information, and content group information.

18. The system of claim 15, wherein the subset of available content groups is sorted in an order of a ranking value calculated based on one or more of recency, clickthru popularity, editorial popularity, rank popularity, taxonomic distance, and collaborative filtering based on indexed web history.

19. The system of claim 15, wherein the subset of available content is sorted for each content group in an order of a ranking value calculated based on one or more of: recency, clickthru popularity, editorial popularity, video quality, textual relevance, video relevance, user rating and collaborative filtering based on indexed web history.

20. The system of claim 15, wherein the subset of available content includes both links to video content stored at the back-end servers, and links to other websites stored on third-party servers.

* * * * *